United States Patent
Pullan

[11] 3,883,993
[45] May 20, 1975

[54] EDGE PROTECTOR STRIP AND SEALING STRIP

[75] Inventor: Ronald Ernest Pullan, Leeds, England

[73] Assignee: Schlegel (UK) Limited, Leeds, England

[22] Filed: May 18, 1973

[21] Appl. No.: 361,399

[30] Foreign Application Priority Data
Jan. 15, 1973 United Kingdom............... 2062/73

[52] U.S. Cl. ..................... 49/490; 49/485; 49/498
[51] Int. Cl............................................ E06b 7/232
[58] Field of Search ............ 49/490, 488, 498, 485, 49/462, 460, 495, 491, 496, 497; 52/716–718

[56] References Cited
UNITED STATES PATENTS

| | | | |
|---|---|---|---|
| 2,684,508 | 7/1954 | Meyers et al. ................... | 49/485 X |
| 3,388,502 | 6/1968 | Ceyer et al. ..................... | 49/498 X |
| 3,656,260 | 4/1972 | Weaver............................. | 49/498 X |
| 3,706,628 | 12/1972 | Azzola ............................. | 49/495 X |

Primary Examiner—Philip C. Kannan
Attorney, Agent, or Firm—Cumpston, Shaw & Stephens

[57] ABSTRACT

An edge protector strip and seal for a flange surrounding a door opening on a motor vehicle, which is manufactured from resiliently deformable plastics or rubber material and is of indefinite length and which, when apart by a web to define a flange receiving channel which is also substantially L shaped, the strip forming a push fit over the flange so as substantially to cover the flange and wherein the seal is preferably substantially semi elliptical and formed of a softer material than the remainder of the strip so that in use it may form a seal with an edge of a door of the vehicle.

13 Claims, 2 Drawing Figures

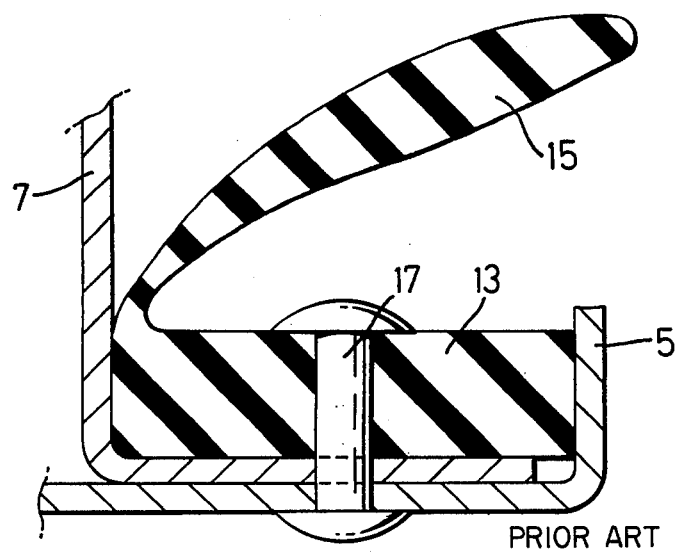
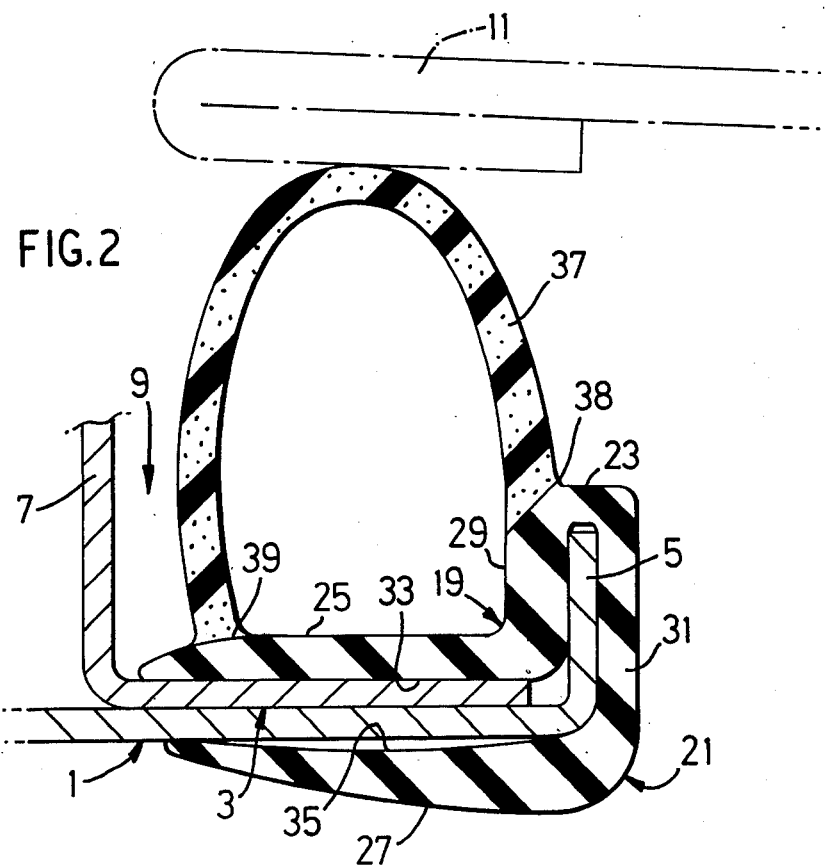

EDGE PROTECTOR STRIP AND SEALING STRIP

BACKGROUND OF THE INVENTION

This invention relates to an edge protector strip and/or sealing strip. The strip is designed primarily for use in the motor industry for application to a metal flange surrounding a door opening or similar opening such as a boot or engine compartment opening on the vehicle or for application to a flange on the door, boot, bonnet or tail gate of the vehicle.

On the majority of present day vehicles, such flanges are of generally "straight" configuration when seen in cross section and result from the welding together of two sheets of metal, and it is normal for an edge protector strip or sealing strip such as that shown in our patent U.S. Pat. No. 3,685,231 to be used. However, such a construction could not be used instead of the sealing strip of the present invention because the inventive sealing strip is designed solely for application to flanges which, when seen in cross section, are not "straight." In other words, the flanges, when seen in cross section have an edge portion which is inclined to the remainder of the flange and for example extends at right angles to the remainder of the flanges, thereby giving the flange, when seen in cross section an 'L' shape. Such flanges will hereinafter be referred to as "flanges of the type described." Very often, such flanges of the type described from the base and one wall of a 'U' shaped channel around an opening in the vehicle, the other upstanding wall of the channel being formed of part of one of the metal sheets, which may, for example provide the roof of the vehicle. In the past, edge protector strips as such have not been used on such flanges of the type described because of difficulties in securing the strips to the flange and accordingly, simple sealing strips have been used which are rivetted or otherwise secured to the flange.

SUMMARY OF THE INVENTION

The present invention seeks to provide an edge protector strip for such flanges of the type described, which can be modified, if desired, also to provide a sealing strip.

According to the present invention, we provide an edge protector strip for a flange of the type described, said strip being manufactured from a resiliently deformable rubber or plastics material and being of indefinite length, the strip, in cross section having a pair of arms spaced apart by a flange receiving channel, each of the arms being shaped at least on their facing surfaces so as to have a generally straight portion extending inwardly from a free edge of the arm to overlie a straight portion of the flange and a further portion inclined at a predetermined angle to the straight portion to abut the inclined edge portion of the flange, and including a web connecting together the ends of the further portions remote from the straight portion, whereby the flange receiving channel between the two parts has dimensions similar to those of the flange to which the strip is to be applied.

In a preferred arrangement, the two further portions are inclined at substantially 90° to the straight portions of the arms with the result that the strip is comprised of a pair of L shaped arms connected by the web.

Preferably, the two straight portions are of substantially equal length, so that, when the strip has been applied to the flange of the type described, the majority of the flange is covered over.

Preferably, a seal is formed integral with or attached to the strip so that the strip is a dual purpose edge protector and sealing strip. Preferably, the seal is of substantially semi-elliptical shape when viewed in cross section, one arm of the semi-ellipse being connected to the strip in the vicinity of the web and the other arm being connected to an inner of the two arms of the strip, adjacent its free edge.

Preferably, the seal is formed of a softer material than the remainder of the strip, such as sponge rubber, and is formed integral with the remainder of the strip by a dual extrusion process.

DRAWINGS

A preferred embodiment of the invention is now described with reference to the accompanying drawings, in which:

FIG. 1 is a section through an L shaped flange of the type described surrounding a door opening in a motor vehicle, to which has been fitted a sealing strip of known configuration and of a type in use today and FIG. 2 is a view similar to FIG. 1, but showing a flange edge protector strip and sealing strip in accordance with the invention.

DETAILED DESCRIPTION

Referring to the drawings, there is shown a flange of the type described which is generally designated by the reference character 1 and has a straight portion 3 formed of two sheets of metal rivetted or welded together and an edge portion 5 which extends at substantially 90° to the straight portion 3. As shown, one of the sheets of metal forming the straight portion 3 has a part thereof of undetermined length extending at right angles to the straight portion 3, as shown at 7, thereby defining a generally rectangular U-shaped channel 9. The edge portion 5 defines the size of the door opening and is designed to be overlapped by a peripheral portion of the vehicle's door 11.

In the past, a seal between the door 11 and the flange 1 has been provided with a sealing strip as shown in FIG. 1. This sealing strip is comprised, when viewed in cross section, of a generally rectangular base portion 13 fitting within the channel 9, from which extends a sealing flap 15, of a length sufficient to overlie the tip of the edge portion 5 of the flange. The sealing strip is connected to the flange 1 by means of a plurality of spaced rivets 17 extending the length of the strip, and it will be appreciated that when the door is closed, the sealing flap 15 will be moved into engagement with the edge of the edge portion 5, thereby forming the seal. Although such sealing strips provide a reasonably satisfactory seal, their method of attachment to the flange is unsatisfactory for several reasons. Firstly, rivets are expensive and cumbersome to use, especially because of the presence of the flap 15, secondly, they tend to deteriorate due to adverse weather conditions and thirdly, the end of the rivet remote from the base portion 13 extends completely through the flange and is unsightly. Furthermore, the rivet 17 provides an ingress point for moisture to corrode the flange 1. Also, of course, little or no edge protection to the flange 5 is given, because its two outer exposed faces are unprotected. Not only does this result in an unsightly appearance, but also, it means that the door opening is bounded by a hard surface with the likelihood of the user of the vehicle knocking against it and injuring himself when entering and leaving the vehicle.

As is shown in FIG. 2, the strip of the present invention is basically comprised of two arms 19 and 21 connected together by a web 23 at their base. Each arm has a straight portion 25, 27 adjacent its free end which merges with an inclined portion 29, 31 respectively. In the construction shown, the portions 29 and 31 extend respectively at right angles to the straight portions 25 and 27 so that the inner surfaces 33 and 35 of the two arms have a configuration substantially corresponding to the two surfaces of the flange to which the strip is to be applied. Although the exact thickness of the two arms can be altered to suit design requirements, it is important that the recess or channel formed between the two arms is dimensioned such that, in use, the strip forms a snug fit on the flange 1 to which it has been applied.

The strip described above could be used on its own as an edge protector strip but it is preferred to combine a seal 37 with the strip. As shown in FIG. 2, the seal 37 has a preferred construction, which when seen in cross section, is generally semi-elliptical, one arm of the semi-ellipse being connected to the remainder of the strip at 38 in the vicinity of the point of connection of the web 23 to the portion 29 on the arm 19 and the other arm of the semi-ellipse being connected to the arm 19, which is the inner of the two arms, adjacent the free end of the arm, as shown at 39. The seal 37 is preferably formed of a softer material than the remainder of the strip and is preferably formed by a dual extrusion process, but it will of course be appreciated that other materials and methods could be used and the seal could have a different configuration and even one similar to that shown in FIG. 1. As shown, the straight portion 25 of the arm 19 substantially covers the inner surface of the base of the channel 9 and the remainder of the strip, formed by the portions 29, 23, 31 and 27 covers a majority of the remainder of the surface of the flange.

Although the strip shown in FIG. 2 is designed for application to a generally L shaped flange, it will be appreciated that seals may be manufactured in accordance with the present invention for application to flanges of the type described, which are not necessarily completely L shaped. For example, the inclination of the edge portion 5 of the flange need not be at 90° to the straight portion 3, in which case, the construction of the strip would be modified accordingly. Furthermore, the straight portion 3 need not be of two layer thickness or alternatively, the portion 5 may be of two layer thickness, in which case, the internal dimensions of the strip may again have to be altered.

It will be appreciated that the strips of the present invention, whether they be mere edge protector strips or combined sealing and edge protector strips, are resiliently deformable and can easily be deformed by an operator so as to be applied over the desired flange and once so located, will remain in position due to their natural resiliency and due to the shape of the strip. No adhesives are required nor of course are rivets required.

What is claimed is:

1. An edge protector strip for a flange generally L-shaped in cross section and having an inclined edge portion forming the shorter straight portion of said L shape and a longer straight portion of said L shape extending away from said inclined edge portion as described, said strip being manufactured from a resiliently deformable rubber or plastics material and being of indefinite length, the strip, in cross section being of generally L-shape and having a pair of spaced apart arms defining a channel shaped to receive said L-shaped flange, each of said arms being shaped at least on their facing surfaces to provide a generally straight portion extending inwardly from a free side edge of said strip at one end of said arms to overlie said longer straight portion of the flange and conceal both sides of said flange, and a further portion of said arms inclined at a predetermined angle to said straight portion and connected thereto at an elbow at the other end of said straight portion, to fit around said inclined edge portion of said shorter straight portion of said flange, said straight portions of said arms being substantially longer than said further portions of said arms, and the thickness of said arms being substantially less than the length of said arms, and including a web spacing said arms apart and connecting together the ends of said further portions remote from said elbow to fit over the free end of said flange whereby the flange receiving channel between said two arms has dimensions similar to those of the flange to which the strip is to be applied and substantially completely covers the flange without requiring any additional fastening devices.

2. An edge protector strip according to claim 1 wherein said two further portions are inclined at substantially 90° to said straight portions of said arms with the result that the strip is comprised of a pair of L shaped arms connected by the web.

3. An edge protector strip according to claim 1 wherein said two straight portions are of substantially equal length, so that, when said strip has been applied to the flange of the type described, the majority of said flange is covered over.

4. An edge protector strip according to claim 1 wherein a resiliently deformable seal is formed integral with one of said arms and extends between the generally concave side of said generally L-shaped strip substantially between said one end of said arm and said web so that the strip is a dual purpose edge protector and sealing strip.

5. An edge protector strip according to claim 1 wherein a resiliently deformable seal is attached to one of said arms and extends between the generally concave side of said generally L-shaped strip substantially between said one end of said arm and said web so that the strip is a dual purpose edge protector and sealing strip.

6. An edge protector strip according to claim 4 wherein said seal is of substantially semi-elliptical shape when viewed in cross section, one arm of the semi-ellipse being connected to the strip in the vicinity of said web and the other arm being connected to said arm which is the inner of the two arms of the strip, adjacent its free edge.

7. An edge protector strip according to claim 4 wherein said seal is formed of a softer material than the remainder of the strip, such as sponge rubber, and is formed integral with the remainder of the strip by a dual extrusion process.

8. An edge protector strip for a substantially L-shaped structural flange having a longer straight portion of said L shape and a shorter straight portion of said L shape inclined relative to said longer straight portion, said strip being manufactured from a resiliently deformable rubber or plastics material and being of indefinite length, the strip, in cross section, having a generally L-shaped body portion divided into two spaced apart arms by a flange receiving channel opening into the body from the end of said longer straight portion of said L shape, each of said arms being substantially L-shaped to provide a generally straight portion extending inwardly from free ends of the arms so said arms overlie said longer straight portion of the flange and said shorter straight portion of said arms inclined at about a right angle to said longer straight portion of said arms and connected thereto at an elbow, to overlie said shorter straight portion of the flange, the flange receiving channel between said two arms having dimensions similar to those of said structural flange so that, when the strip is fitted directly onto the flange without separate fastening means, it substantially completely covers the flange, the arms being longer than their width, and each straight portion of said arms being longer than said further portion of said arms.

9. An edge protector strip according to claim 8 wherein a resiliently deformable seal is formed integral with one of said arms and extends between the end regions of said L-shape at the generally concave side of said L-shape so that the strip is a dual purpose edge protector and sealing strip.

10. An edge protector strip according to claim 8 wherein a resiliently deformable seal is attached to one of said arms and extends between the end regions of said L-shape at the generally concave side of said L-shape so that the strip is a dual purpose edge protector and sealing strip.

11. An edge protector strip according to claim 9 wherein said seal is of substantially semi-elliptical shape when viewed in cross section, the seal being connected to the strip in the vicinity of a web and connecting said arms adjacent a free edge of the inner of the two arms of the strip.

12. An edge protector strip according to claim 9 wherein said seal is formed of a softer material than the remainder of the strip, such as sponge rubber, and is formed integral with the remainder of the strip by a dual extrusion process.

13. An edge protector strip according to claim 9 wherein said seal extends outwardly of said strip, on one side thereof, and extends between end portions of said generally L-shaped body portion.

* * * * *